United States Patent [19]
Babu et al.

[11] Patent Number: 6,122,639
[45] Date of Patent: *Sep. 19, 2000

[54] NETWORK DEVICE INFORMATION COLLECTION AND CHANGE DETECTION

[75] Inventors: Vidya Babu, Saratoga; Michael F. Fredrich, Fremont; Christopher A. White, Saratoga, all of Calif.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/997,156

[22] Filed: Dec. 23, 1997

[51] Int. Cl.[7] .................................. G06F 9/00; G06F 6/00
[52] U.S. Cl. ............................................................ 707/103
[58] Field of Search .......................................... 707/1–226

[56] References Cited

U.S. PATENT DOCUMENTS

| | | | |
|---|---|---|---|
| 4,827,411 | 5/1989 | Arrowood et al. . | |
| 4,965,772 | 10/1990 | Daniel et al. . | |
| 5,371,851 | 12/1994 | Pieper et al. | 345/507 |
| 5,434,775 | 7/1995 | Sims et al. | 705/8 |
| 5,485,634 | 1/1996 | Weiser et al. | 455/507 |
| 5,555,244 | 9/1996 | Gupta et al. . | |
| 5,594,792 | 1/1997 | Chouraki et al. | 379/269 |
| 5,619,615 | 4/1997 | Pitchaikani et al. . | |
| 5,673,265 | 9/1997 | Gupta et al. . | |
| 5,684,988 | 11/1997 | Pitchaikani et al. . | |
| 5,821,937 | 10/1998 | Tonelli et al. | 345/356 |

*Primary Examiner*—Hosain T. Alam
*Assistant Examiner*—John G. Mills
*Attorney, Agent, or Firm*—Hickman Palermo Truong & Becker; Christopher J. Palermo; Carl L. Brandt

[57] ABSTRACT

Mechanisms for network device information collection and change detection are disclosed. A data Collection Engine is coupled to a database and a network having comprising devices such as switches and routers. The Collection Engine receives a network device name and queries the network to locate the named device. Based upon a device type identifier, the Collection Engine identifies the class of the device and a group of information sets that describe information needed from the device. The Collection Engine requests information described by the information sets and stores it in the database. A change detection mechanism compares the received information to a prior version in the database, and develops metadata describing changes in the versions. Accordingly, only a subset of all the information that a device can deliver is received and stored, based on the needs of an application using the mechanisms. A carrier wave may carry software program instructions that carry out the foregoing functions from a remote location.

9 Claims, 11 Drawing Sheets

NETWORK DEVICE INFORMATION COLLECTION AND CHANGE DETECTION

FIELD OF THE INVENTION

The present invention generally relates to computer networks, and relates specifically to collecting, detecting changes in, reporting on, and managing network device information.

BACKGROUND OF THE INVENTION

A computer network generally includes a number of networking devices, such as switches, routers, and others, connected so as to allow communication among the devices and end station devices such as desktop machines, servers, hosts, printers, fax machines, and others. Each network device has a processor and a memory; status variables and other values in the memory are continuously changed and updated as the device operates. To monitor the status of a device in the network, a network management station transmits a message requesting information over the network to a software program or agent running on the target device. In response, the agent sends a message over the network to the network management station. The communications are carried out according to an agreed-upon protocol, such as the Simple Network Management Protocol (SNMP).

These networks usually consist of many different types of data switching and routing devices, such as switches, routers, and hubs. Each device can have different physical characteristics. New devices, with characteristics that are presently unknown, are being developed. In addition, the characteristics of many network devices may change over time. For example, network device characteristics change when subsystems like boards, network interface modules, and other parts are added or removed from a device. However, maintaining a network requires network administrators and managers to have up-to-date network device information constantly at their fingertips.

One approach is to provide the network with a data collection mechanism or system that can gather information about the network devices and report on it to management. It is desirable for such a network data collection system to adapt to changes in device characteristics. It is also desirable for the data collection system to be extensible, so that it can easily accommodate new device types.

Based on the foregoing, there is a clear need for a network data collection mechanism that allows device characteristics to be added, modified and stored without affecting the underlying data collection mechanism. These characteristics must be specific to each device type. However, it is also advantageous to be able to combine characteristics that describe families of similar devices. Further, it is necessary to determine all the device information, including device types, in a real-time fashion, by gathering it from operating devices.

It is also desirable to have a mechanism that can detect changes in the network and preserve a record of such changes for further analysis, without adversely affecting the data collection mechanism. It is also desirable for the change detection mechanism to be able to identify a network device for which a change has occurred, and determine the details of a specific change.

The type of information a device can provide in this manner depends on the Management Information Bases (MIBs) that are supported by the device. A MIB specifies groups of objects, and each object defines a group of data types. An agent or device supports a MIB if the agent is capable of supplying the type of information defined in the objects specified in the MIB. Most agents or devices can provide the type information defined in the objects specified in certain standard MIBs, known as MIB I and MIB II. The format and layout of MIB II is specified in Request For Comments (RFC) 1213. Additional standard MIBs have been defined for information types not covered in MIB I and MIB II, and new MIBs are being developed on an ongoing basis. However, support for these standard MIBs varies from device to device. An agent may only support a subset of a MIB. Further, many device manufacturers have developed their own proprietary MIBs, and many devices or agents operate in more than one mode. An agent or device working in one mode may support different MIBs or different parts of MIBs than the same agent or device executing in another mode.

Past approaches to collecting information from network devices suffer from numerous distinct disadvantages. For example, one approach used by network management mechanisms and software applications that exist today is to provide a table that stores MIB objects for each type of device that is supported by the application. There is a separate table for each device type. The disadvantage of this approach is that a new table has to be created and patched into the application program in order to collect information from a new type of device. The amount of information stored grows proportionally to the number of devices supported. Also, when the format or type of information being collected is changed, the format of the data store associated with one or more device types may also have to be changed. Accordingly, maintenance of the software becomes unwieldy.

It is known that the MIB objects needed for many device types overlap. For example, two different types of devices may have several MIB objects in common, but also store MIB objects that are not supported by the other type of device. However, past approaches do not recognize such overlap. In past approaches, tables are defined for each device type. There is no way to correlate the MIB objects used by one device with those used by another device. As a result, duplicative information is stored.

Based on the foregoing, it is clearly desirable to have a network information collection mechanism that can adapt to new devices when they are added to a network.

It is also desirable to have a network information collection system that can detect changes in the information that is being collected, and therefore detect changes in the network.

It is also desirable to have a network information collection system that can report changes in the network in a manner that is flexible and independent of any application in which the change information may be used.

It is also desirable to have a network information collection system that operates and adapts to upgrades, updates or other changes in the MIB objects collected for a given device type without requiring reconstruction or recompilation of the system.

SUMMARY OF THE INVENTION

One aspect of the invention encompasses a method of collecting information about a device in a network for storage in a database, comprising the steps of (A) obtaining a device type identifier from the device; (B) mapping the device type identifier to a plurality of information sets associated with the device type identifier; (C) obtaining current values for the information sets from the device; and (D) storing the current values in a current information set value table of the database in association with the device type identifier.

One feature of this aspect is the step of (E) verifying that the device type identifier obtained from the device is known to the database. Another feature is that step (E) further comprises the steps of (E1) looking up the device type identifier in a device type table stored in the database; and (E2) raising an exception when the device type identifier is not found in the device type table.

Another feature of this aspect is that step (B) comprises the steps of (B1) looking up the device type identifier in a first table of the database that maps the device type identifier to a plurality of information set identifiers; and (B2) retrieving, from a second table of the database that stores a plurality of information sets, a subset of the plurality of information sets that corresponds to the plurality of information set identifiers. Still another feature is that step (B) comprises the steps of (B1) looking up the device type identifier in Device Type to MIB Set table of the database that maps the device type identifier to a plurality of MIB Set identifiers; and (B2) retrieving, from a MIB Set table of the database that stores a plurality of MIB Sets, a subset of the plurality of MIB Sets that corresponds to the plurality of MIB Set identifiers.

Yet another feature involves the steps of (F) comparing values in the current information set value table to corresponding values in a prior version information set value table in the database; (G) detecting changes that characterize the current information set value table when compared to the prior version information set value table; and (H) generating a report of the changes. A related feature is that step (H) comprises the steps of (H1) for each change detected in step (G), storing metadata that describe each change in columns of a change table in the database.

Still another feature is that step (H1) comprises the steps of (H2) for each change detected in step (G), storing information characterizing each change in columns of a change table in the database, including a Table Identifier value that identifies the information set that has changed; an Association value that identifies a location in the information set at which the change occurred; an Attributes value that describes a type of the change; a Previous Value derived from the prior information set value table; and a Current Value derived from the current information set value table.

According to yet another feature, step (A) comprises the steps of (A1) sending an SNMP Query For a system object identifier to the network; (A2) testing whether the device is discovered in the network, and raising an exception if the device is not discovered; (A3) receiving an SNMP Reply from the device that contains the system object identifier of the device. Still another feature includes the step of (A4) receiving basic device data from the device, including a device type of the device.

Yet another feature is that step (C) further comprises the steps of (C1) constructing an SNMP Query for Detailed Device Data, based upon the basic device data; (C2) sending the SNMP Query for Detailed Device Data to the device over the network; (C3) testing whether the device is discovered in the network, and raising an exception if the device is not discovered; (C4) receiving an SNMP Reply containing detailed device data relating to the device. According to another feature, step (B) further comprises the step of (B1) selecting one of a plurality of the information sets by matching an application program identifier in the information set to a name of a currently running application program.

The mechanism and methods for collecting and detecting changes in network device information described herein have numerous important advantages. For example, the data collection mechanism is advantageous for gathering information from network devices in a way that allows the information collected to be changed or added without affecting the underlying data collection mechanism.

The mechanism allows runtime binding of a device's type to an information set that defines information that is collected from the device.

The mechanism aggregates discrete information subsets into larger information sets, gathering only a device-specific set of information from each particular device, thereby reducing storage needed for data collected from each device and reducing collection time. The mechanism also aggregates various device types into device classes, each of which uses a limited number of information sets based on families of similar devices.

The mechanism is based upon a data-driven model in which device classes and their characteristics can be defined without affecting the operation of the collection mechanism.

The mechanism allows new information sets and subsets to be changed or added without affecting the underlying data collection mechanism, and allows information acquired from a device to be stored in persistent storage in a way that maps the acquired data to the original information set. Thus, the mechanism has the ability to adapt to changes faster than prior methods.

The mechanism operates in conjunction with a data model or table schema that is dynamically extensible to support devices that have not been created, tested or modeled.

In addition, when the definition of the information to be collected from a device changes, only the contents of the information set needs to be changed; the data collection mechanism is not affected and requires no changes. New devices may only require mapping to an existing information set or the definition of a new information set. Because the underlying data collection mechanism is unaltered, the likelihood of introducing defects is reduced, and the maintainability and reliability of the mechanism as a whole are enhanced.

The change detection mechanism allows a clear distinction between previously collected information sets and a newly collected information sets on a network device. The change detection mechanism is able to recognize changes between previous and new information sets, wherein changes are defined as new information that never existed before, or information that existed before but no longer is present, or modified information.

The change detection mechanism is separate from definitions of the information sets used in change detection. Thus, when the change detection mechanism runs, it does not need advance knowledge of the information set to carry out a comparison operation. Also, the mechanism allows new information sets and subsets to be changed or added without affecting the detection scheme.

The change detection mechanism ensures that changes detected in a device are stored in persistent storage in a way which maps the acquired data to the original information set and allows relational queries to be made on the changes that are detected. The persistent storage is separate from the information set definitions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for network device information collection and change detection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Generally, according to the invention, a data collection mechanism, having a Collection Engine, acquires a device type from a network device and builds an information set by aggregating information subsets. Alternatively, the device type is mapped to a device class, the device class maps to information subsets, and the information set is constructed using the information subsets. The Collection Engine queries the device for the data defined in the information set. The information returned to the Collection Engine by the device is stored in persistent storage in a format that maps each acquired data item to an element in the original information set.

In one embodiment, the Collection Engine generally is useful in connection with a computer program, such as a network information management application. For example, the Collection Engine is a stand-alone process or background service that runs in a background mode, and is called by an application when Collection Engine operations are needed. In all these embodiments, the application is sometimes referred to herein as "the calling program", "an external program," or a daemon.

Other applications in which the mechanisms described herein are potentially useful include network configuration, network device performance data analysis, network traffic analysis, network device monitoring, network device availability management, "network dashboard" applications that provide summaries of key indicators, and others.

Figure 1:
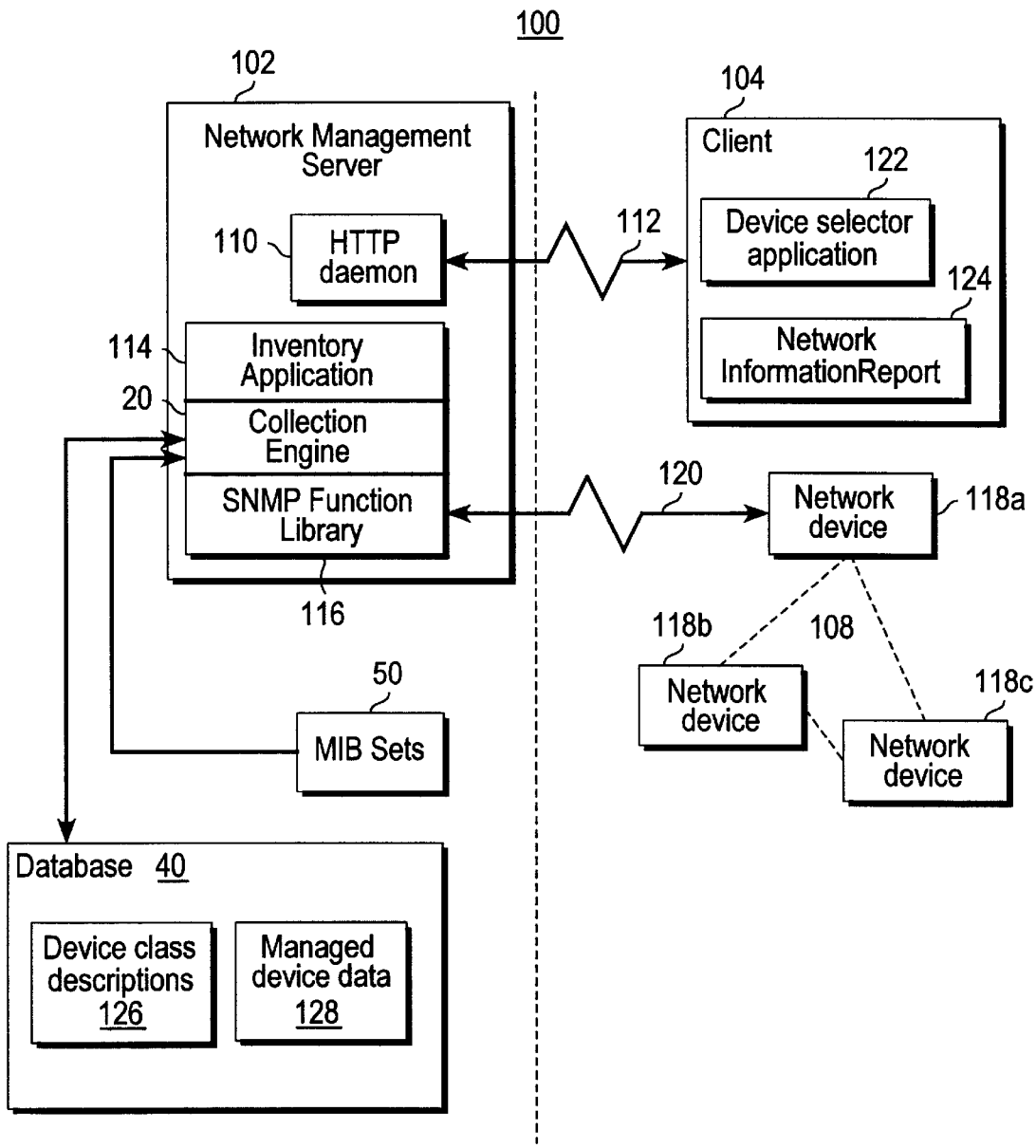
FIG. 1 is a block diagram of a computer system architecture in which the present invention may be utilized.

FIG. 1 is a block diagram of a data processing system in which the invention can be used. Generally, the system 100 has a Network Management Server 102, a client 104, a database 40, and a network 108. The Network Management Server 102 is a computer system, or a group of hardware and software components operating in a computer system. The Network Management Server 102 has a Hypertext Transfer Protocol (HTTP) daemon 110 that can open and establish an HTTP connection 112 to the client 104. The HTTP connection 112 is a data communications channel that uses a local area network (or "intranet") as a backbone. Alternatively, the HTTP connection 112 is established using the global data communication network known as the Internet as an intermediate communication channel.

The Network Management Server 102 also runs application programs, such as a network inventory management application 114. The inventory application 114 provides a back-end, server-side mechanism for supervising gathering, management, and reporting operations relating to information about the network 108. The inventory application 114 is coupled to a Collection Engine 20 that is described in detail below.

The Network Management Server 102 also has an SNMP Function Library 116 that can communicate using an SNMP connection 120 with network devices 118a, 118b, 118c in the network 108. The SNMP Function Library 116 is a set of functions, subroutines, or objects that enable other programs, such as the inventory application 114 and Collection Engine 20, to communicate using SNMP commands and instructions. In an embodiment, the SNMP Function Library 116 has a published Application Programming Interface (API). Thus, an application program can call functions in the SNMP Function Library 116 by assembling appropriate parameters and then calling a function named in the API using the parameters. The SNMP connection 120 is established over a local area network that is the same or separate from the network used for the HTTP connection 112.

The network 108 is a local area network comprising any number of network devices 118a, 118b, 118c interconnected by a communications channel. Ethernet, Token Ring, and other protocols can characterize the communications channel. The network devices 118a–118c are routers, switches, and other backbone devices that guide data communications among clients and servers.

The client 104 is a computer system, program or process that runs a World Wide Web browser or other program that can communicate with the HTTP daemon 110 over the HTTP connection 112, such as Netscape Navigator® or Microsoft Internet Explorer®. The client 104 runs local application software, such as an device selector application 122, that uses the information collected by the Collection Engine 20 from the network 108. The Client 104 also has local persistent storage and display capability that can be used for Network Information Report 124. For example, the Web browser of the client 104 can be used to display the report 124.

The database 40 is a commercial database server or database system. The database 40 manages data tables that store information sets that define what needs to be collected from devices in the network 108, and information needed by the Collection Engine 20 to interpret the information collected from the network 108. The network devices 118a–118c from which information has been collected are also called "managed devices" because they are under management of the Collection Engine 20 and the application 114. The data tables generally comprise a table of device class descriptions 126 and a managed device data table 128 that stores data relating to the devices in the network 108. The Collection Engine 20 is also coupled to MIB sets 50 that provide a description of the information sets that each network device 118a–118c can supply to the system.

The invention is not limited to the context shown in FIG. 1, and the spirit and scope of the invention include other contexts and applications in which the functions of the Collection Engine described herein are available to another mechanism, method, program, or process.

Data Collection Engine

Figure 2:
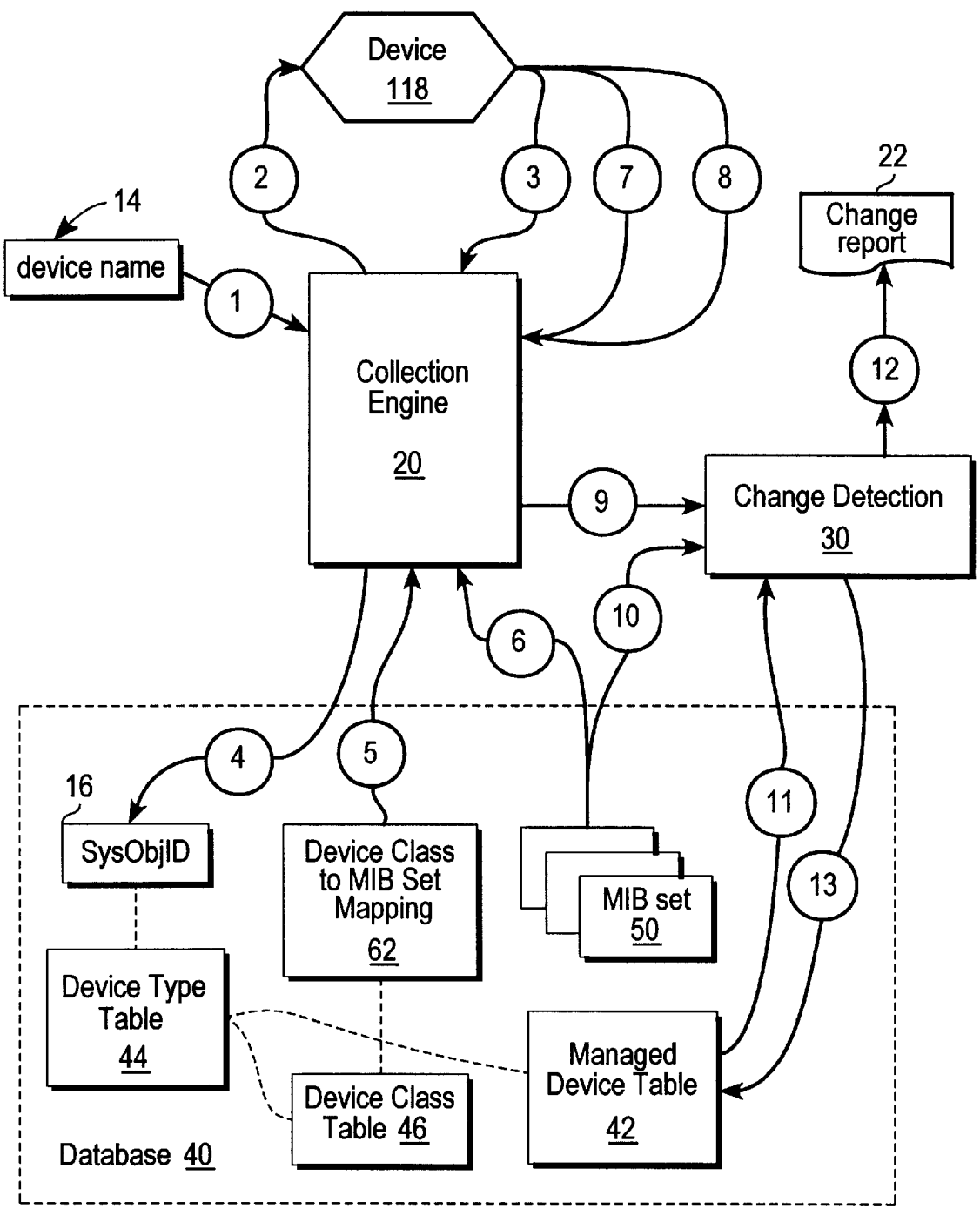
FIG. 2 is a block diagram of a network information management system.

FIG. 2 is a diagram showing a Collection Engine 20 coupled to a Change Detection mechanism 30 and a database 40. The Collection Engine 20 is also coupled to a network that contains one or more network devices from which information is collected and managed. In FIG. 2, one network device 118 is shown; in practice, the network device 118 is one of many network devices that are logically or physically interconnected in one or more local area networks, wide area networks, or internetworks that are accessible to the Collection Engine 20.

In one embodiment, the database 40 is a relational database system or an object-relational database system, such as a Sybase® database server and related components. Operation of the Collection Engine 20 is initiated in state 1 by supplying a device name 14, and other information with which the Collection Engine can locate a device, such as SNMP community strings, to the Collection Engine. For example, in one embodiment, an application program calls the Collection Engine 20 using a function call that requests the Collection Engine to collect data from a particular network device 118, and supplies a device name 14 that identifies the network device 118.

Figure 3:
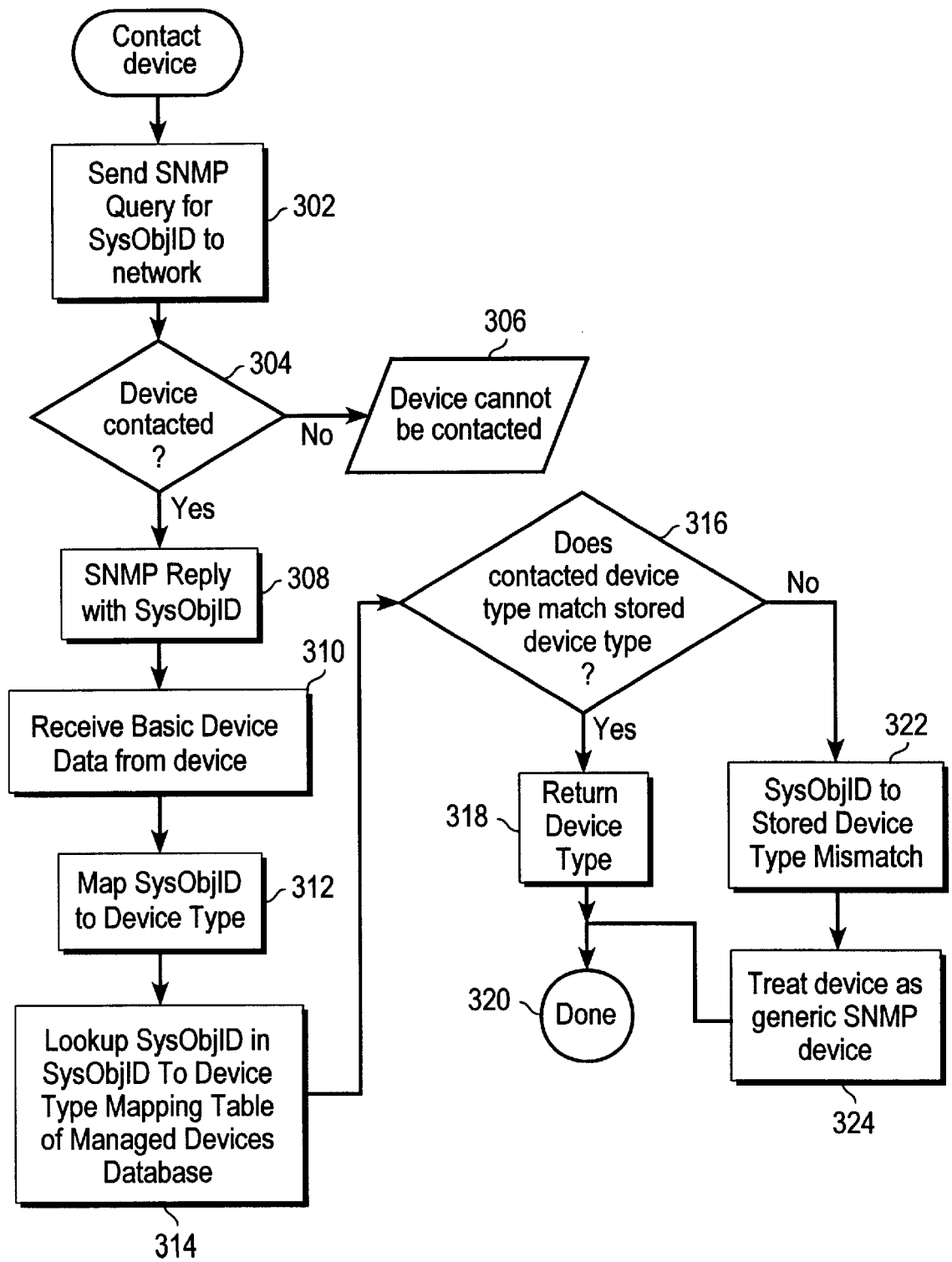
FIG. 3 is a flow diagram of a method of discovering and checking a network device.

In response to the collection request, the Collection Engine 20 enters state 2, in which it sends an SNMP message over the network to the network device 118. The processes carried out in state 2 and certain other states are also shown in FIG. 3, which is a block diagram of an embodiment of a method of discovering and checking a device. The SNMP message queries the network device 12, in effect asking the device 118 to identify itself by providing a device type identifier for itself. This state is called the "discover device" state. In the method of FIG. 3, a SNMP Query is carried out in block 302. In block 302 the method also constructs data structures needed to interface to the SNMP Function Library 16 or another SNMP API.

In response, as shown by state 3 and in block 308, the network device 118 responds by providing a device type identifier. In the parlance used in Management Information Bases (MIBs), a network device is called an "object," and the device type identifier is known as a "System Object Identifier" or "SysObjectID." Thus, in one embodiment, states 2 and 3 respectively involve making an SNMP Query for the SysObjectID and providing an SNMP Reply with the SysObjectID. An example of a SysObjectID is "1.3.6.1.4.1.9.1". SysObjectIDs are not unique within a network; multiple devices within a network may be of the same type and therefore have the same SysObjectID. Each SysObjectID uniquely identifies one and only one device type.

When the SNMP request is sent, it is possible that the requested device is not present in the network. In this case, no network device responds to the SNMP Query, or the SNMP subsystem raises an exception. If no device exists in the network that matches the device name 14, as shown in block 304, then in block 306 an exception is raised, and control returns to the calling program or process. In an embodiment, this exception is called "failure to contact device."

When the SNMP Query is successful, as shown in block 310, the network device 118 also responds by providing a set of Basic Device Data that represents basic information about the device. The Basic Device Data includes device name, domain name in which the device is located, and a Device Type code that identifies the specific type of device that has responded, e.g., "Router 2504," including its model number or other device-specific identifying information.

It is desirable to map the Device Type received from the network device to a stored list of device types, in order to determine whether the Device Type of the responding network device is known and can be handled, as shown in block 312. Accordingly, as shown in FIG. 2, the database 40 includes a Device Type table 44 that stores a list of recognized device types. In an embodiment, the Device Type table 44 has a row for each unique SysObjectID value. Columns of the Device Type table 44 store a class identifier for the device; the name of the device type like "Router 2504"; the manufacturer of the device; and a description of the device. In state 4, and block 314, the device type identifier 16 that has been received from the device 118 is used as a key to look up rows in the Device Type table 44. In an embodiment, this lookup operation and the other lookup operations described herein are accomplished using queries in the Structured Query Language (SQL) to tables in the database 40. This test is shown in block 316.

If a matching row is found, then the device type identifier 16 is considered to be recognized, and collection of more detailed device information can occur. Block 318 indicates that when a match occurs, the Device Type received from the device 118 is returned to the calling program by the Collection Engine 20. If there is no match, the device type identifier 16 is unknown. The device type identifier is marked as "generic" so that the corresponding device is treated as a generic SNMP device in later processing. The collection of information from the device proceeds, although relatively little information is collected from a generic device. In an embodiment, as shown in block 322, this condition is called "SysObjectID to Stored Dev Type Mismatch." In block 324, the device is treated as a generic SNMP device for further processing. In an alternative embodiment, when such a mismatch occurs, the Collection Engine 20 raises an exception and communicates an error code to the calling program.

Device type identifiers are mapped to device classes in a Device Class Table 46. A device class is a broader group of devices that support similar MIB objects; each device type in a device class can provide the same data values defined in a group of MIB objects. Examples of device classes are "Cisco® Router" and "Switches". In an embodiment, the Device Class Table 46 is a database table that stores values in columns named SysObjectID, DeviceName, and DeviceClass. Table 1 below presents example values from columns of the Device Class Table 46:

TABLE 1

EXAMPLE DEVICE TYPETABLE VALUES

| | | |
|---|---|---|
| 1.3.6.1.4.1.9.1, | Router GatewayServer, | Cisco Router |
| 1.3.6.1.4.1.9.1.18, | Router 2502, | Cisco Router |
| 1.3.6.1.4.1.9.1.131, | Router CPA2504, | Cisco Router |

In Table 1, the first record or row has a SysObjectID of "1.3.6.1.4.1.9.1." The device type corresponding to that identifier is "Router GatewayServer." The class of such devices is "Cisco Router." As indicated in Table 1, each SysObjectID and device type uniquely identifies one type or model of network device, but device classes include multiple device types. Each device class support common group of MIB Sets. A MIB Set is defined as a subset of a MIB supported by a device type; a MIB Set represents the smallest block of information from a supported MIB that can be delivered from the device over the network using the SNMP protocol. Based on the device class, the Collection Engine 20 selects MIB Sets associated with the class and requests the information described in those MIB Sets from the device 118.

The Database 40 contains sets of records that define groupings of MIB objects. Each grouping is called a MIB Set. Table 2 below presents two examples of MIB Set definitions:

TABLE 2

EXCERPT FROM MIB SET DEFINITION TABLE

| MIB Set Id | Application Id | MIB Object Name | Destination DB Column | Attributes |
|---|---|---|---|---|
| 2 | 2 | ifIndex | ifIndex | 1 |
| 2 | 2 | ifDescr | ilDescr | |
| 2 | 2 | ifType | ifType | |
| 2 | 2 | ifSpeed | ifSpeed | |
| 2 | 2 | ifPhysAddress | ifPhysAddress | 2 |
| 9 | 2 | ciscoImageIndex | ciscoImageIndex | 3 |
| 9 | 2 | ciscoImageString | ciscoImageString | |

In Table 2, the first line or heading represents the names of column stored in a MIB Set definition. The remaining lines of Table 2 between the first and last line each identify a MIB Set element. Table 2 contains definitions of two MIB Sets. Each MIB set is identified by a numeric identifier that appears in the first column labeled "MIB Set Id". MIB Sets "2" and "9" are illustrated. Each element in a MIB Set is associated with an application program. In Table 2, the second column labeled "Application Id" contains a value that identifies the application program. In this embodiment, the value "2" refers to the Collection Engine 20. The Collection Engine 20 will request this MIB Set from a device only when the application program that is currently running and using the Collection Engine 20 matches the application name stored in the MIB Set definition. Thus, the application name stored in the MIB Set provides a way to further filter the data that will be requested from the device, before a query for such data is sent to the device.

In Table 2, the third and forth columns labeled "MIB Object Name" and "Destination DB Column" contain the name of a MIB variable and the name of a column which the value of the variable is to be stored. For example, the first value "ifIndex" is the name of a MIB variable; the second value "IfIndex" is the name of a column in the destination table in which the value of the "ifIndex" variable is to be stored. Similarly, the pair of values "ciscoImageString" and "ciscoImageString" identifies a MIB variable and a column in the table where its value is to be stored. The destination table is determined by the user of the MIB Set. The destination table is defined by the entry referencing the MIB Set in the Device Class to MIB Set Mapping 62 table. Advantageously, information collected through the use of a given MIB Set may be stored in different destination tables as long as column names in that table match those defined in the MIB Set.

In Table 2, all MIB variable name and database column name contain the same name for both values, but this is not required. Advantageously, storing both the MIB variable names and database column names provides for embodiments of database 40 which support table names too small to accommodate names as large as the MIB variable names. In Table 2, the fifth column labeled "Attributes" contains a numeric value which represents two one-bit flags. The high bit signifies whether the associated MIB object is to be used as a comparison key by the Change Detection Mechanism 30 and the low bit signifies whether the MIB object is to be used as a key to the MIB Set tables 50 in the database 40.

The MIB Sets 50 are stored in tables of the database 40. Thus, each database table corresponds to the smallest block of information in a supported MIB that can be received from a device over SNMP. In another embodiment, each object defined in a MIB is stored in a separate database table. Each network device 118 also stores current values for MIB Set objects in a local, non-persistent memory in the network device. Key values or key columns for the database corresponding to a polled MIB variable are identified as database keys in the Device Class to MIB Set Mapping 62.

Alternatively, the MIB Sets are persistently stored in one or more files managed by an operating system. However, using a database system provides the capability to maintain the data in a normalized form. A file-based mechanism requires a supporting system, similar to a database system, to achieve data integrity. Another advantage of using the database is that external APIs can be used to extract or enhance the data definitions easily.

The database 40 has a Device Class to MIB Set Mapping 62 in the database that maps device types to MIB Sets 50. In an embodiment, the Device Class to MIB Set Mapping 62 is a database table in which each record or row is mapped to a device class identifier like "CiscoRouter". Columns of the Device Class to MIB Set Mapping 62 store identifiers for each MIB Set 50 that is used by devices in that class.

In an alternative embodiment, the database maps device types to MIB Sets in a table that has columns that store device type identifiers and names of MIB variables or MIB objects that are associated with a device type. When a new device is developed, a new row is added to the mapping to describe MIB Sets 50 associated with that device. Also, when a software update, hardware re-configuration, or other alteration changes the information processed by an existing device, the mapping is updated to reflect the change by adding, deleting, or modifying the MIB Set identifiers in rows that identify the device.

Thus, the Device Class to MIB Set Mapping 62 provides a powerful way to correlate devices with subsets of the total information set, or MIBs, supported by devices. Using the mapping, a device type can be correlated with MIB subsets that overlap with MIB subsets of other devices. This fundamental abstraction or data model provides a key advantage over prior approaches. Advantageously, the MIB Sets associated with a device are separated from the Collection Engine 20 and from any application program that uses the Collection Engine or that needs MIB information from a device.

In an embodiment, the Device Class to MIB Set Mapping 62 is prepared in advance of operation of the Collection Engine 20.

In an alternate embodiment, the Device Class to MIB Set Mapping 62 also has a column that stores an identifier of an application program that uses the Device to MIB Set Mapping 62 and the Collection Engine 20. Using the application identifier column, the Device Class to MIB Set Mapping 62 maps network devices 118 to application programs as well as to MIB Sets 50. This configuration provides an important advantage. It enables the Collection Engine 20 to collect from a particular device only the information needed by a specific application program. Advantageously, the Device Class to MIB Set Mapping 62 is stored separately from the Collection Engine 20 and from the application programs that use it.

Table 3 below is an example of a portion of the Device Class to MIB Set Mapping 62 that maps the device class CiscoRouter to various MIB Sets:

TABLE 3

EXCERPT FROM DEVICE CLASS TO MIB SET MAPPING

| Device Class | Table Name | MIB Parent Name | MIB Set | Attributes | Parent Table Name |
|---|---|---|---|---|---|
| CiscoRouter | DEV_SNMP_SYS | system | 1 | 0 | |
| CiscoRouter | DEV_IF | ifEntry | 2 | 1 | |
| CiscoRouter | DEV_IF | ipAddrEntry | 3 | 1 | |
| CiscoRouter | CISCO_BRIDGE | ciscoBridge | 4 | 0 | |
| CiscoRouter | CISCO_CHASSIS | chassis | 5 | 0 | |
| CiscoRouter | CISCO_CHASSIS | lflash | 6 | 0 | |
| CiscoRouter | CISCO_CHASSIS | lsystem | 7 | 0 | |
| CiscoRouter | CHASSIS_MODEM | modemTableEntry | 8 | 1 | CISCO_CHASSIS |
| CiscoRouter | CISCO_IMAGE | imageTableEntry | 9 | 1 | |
| CiscoRouter | FLASH_DEVICE | flashDevTableEntry | 10 | 1 | |
| CiscoRouter | FLASH_PARTITION | flashParTableEntry | 11 | 1 | FLASH_DEVICE |
| CiscoRouter | FLASR_FILE | flashFileEntry | 12 | 1 | FLASH_PARTITION |
| CiscoRouter | CHASSIS_CARD | cardTableEntry | 13 | 1 | CISCO_CHASSIS |
| CiscoRouter | CHASSIS_FLASH | flashTableEntry | 14 | 5 | CISCO_CHASSIS |

In Table 3, each heading item corresponds to the name of a column in the Device Class to MIB Set Mapping 62. The remaining lines of Table 3 between the first and last line each identify a MIB Set using pairs of values. The values in the column labeled "Table Name" each identifies the name of a database table that contains MIB Set information. For example, in the second line of Table 3, the value DEV_SNMP_SYS is a database table name. Thus, the Device Class to MIB Set Mapping 62 defines where to store information that is received from a device. Advantageously, this enables the Collection Engine 20 to adapt to different application programs. The Collection Engine 20 can determine the destination of the information defined in the MIB Set without an understanding of the information or the application requesting the information. When a table used by an underlying application program changes, the Collection Engine 20 can be updated by modifying only the appropriate table name in the Device Class to MIB Set Mapping 62. The Collection Engine 20 needs no prior knowledge about the underlying storage mechanism or schema used by the application program; table names are resolved at runtime by reading them from the mapping.

The values in the column labeled "MIB Parent Name" of Table 3 identify the parent MIB object for the MIB Set. In standard MIB set definitions, such as RFC 1213, MIBs are defined according to a hierarchical tree of objects comprising a topmost or parent object that points to one or more subordinate or child objects. The Collection Engine 20 can use the parent object that is provided in the mapping to locate subordinate objects of the MIB set.

In Table 3, the fourth column labeled "MIB Set" contains the identifier of the MIB Set associated with each entry in the Device Class to MIB Set table. This value determines which entries in the MIB Set Table will be extracted.

The numeric value in the fifth column of Table 3, labeled "Attributes", signifies whether the associated Parent MIB object is a scalar object or a vector object. Vector objects may result in more than one value being returned to the Collection Engine 20 for a query of a single object and more than one row being stored in the Database 40.

The column labeled "Parent Table Name" specifies a parent table for the table specified in the "Table Name" column. The parent table entry defines a table's dependency on its parent table. In some cases an entry in one table cannot be made unless a entry already exists in the parent table. For example, in the fourteenth row in Table 3, CHASSIS_CARD appears in the "Table Name" column and CISCO_CHASSIS appears in the "Parent Table Name" column. This means in order to insert a row into the CHASSIS_CARD table for a given device, an entry in the CISCO_CHASSIS table for that device must exist. This is sometimes referred to as a "table referential integrity rule".

Figure 5:
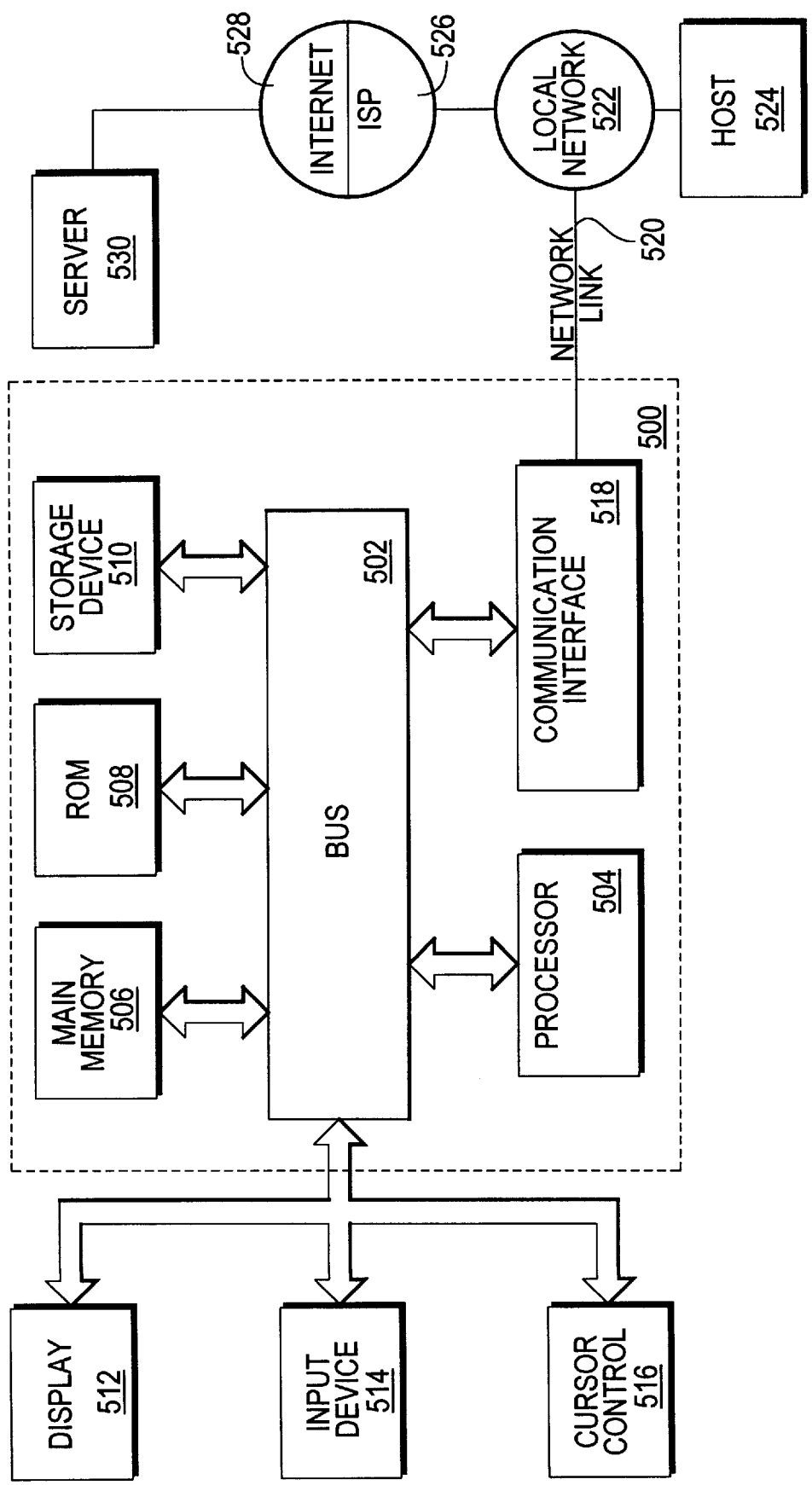
FIG. 5 is a block diagram of a computer system hardware arrangement that can be used to implement the invention.

Preferably, in other embodiments, the structure of the MIB Set and Device Class To MIB Set tables are modified to produce a more highly normalized database schema. Alternatively, using an object oriented database, objects are constructed for such items as MIB Sets. As shown by state 5, using the device type identifier 16 as a key to the Device Type Table 44, the device class is obtained from the Device Class Table 46. Also, using the Device Class to MIB Set Table in the database 40, the Collection Engine 20 looks up the identifiers for MIB Sets 50 that match the device type identifier. Upon receiving the identifiers for matching MIB Sets 50, in state 6 the Collection Engine 20 requests the database 40 to retrieve copies of the MIB Sets 50 from the database. The Database 40 returns the MIB Sets and the Collection Engine 20 stores the MIB Sets in Main Memory 506 (FIG. 5).

In state 7, the Collection Engine 20 issues a query to the network device 118 identified by the device name 14, requesting that device to supply current values for the information defined in the MIB sets 50. Preferably, the Collection Engine 20 stores "current" values just received from the device 118 in Main Memory 506 in a manner which allows values received in the past and stored in the Database 40, to also be stored into memory and related. Advantageously, this embodiment is independent of the embodiment of Database 40 and maximizes the speed of comparison of old and new values. Alternatively, the database 40 maintains one set of tables that store "current" values just received from the device 118, and a separate set of tables of values that have been received in the past.

In state 8, the network device 118 responds by supplying a copy of the requested values to the Collection Engine 20. For example, the network device 118 provides an SNMP Reply with DDD. The Detailed Device Data includes all values in the device 118 for each object of each MIB Set 50 specified in the query. Thus, in state 8 the Collection Engine 20 acquires a complete set of values for those MIB Sets 50 that are defined in the database 40 as associated with the device 118. Advantageously, the Collection Engine does not request or receive data for MIB Sets that are not supported by the device 118, or for MIB sets that are supported by the device 118 but which are not needed by the application that is using the Collection Engine 20.

The values received in the Detailed Device Data are then stored in tables of the database 40, according to the table names and columns that are specified in the Device Class to MIB Set Mapping 62. In one embodiment, the Detailed Device Data is converted to a canonical storage format, such as a set of string objects, before it is stored in tables in the database 40. Alternatively, the storage type of each MIB object could be stored in the Database 40 and the Detailed Device Data could be stored in native form.

In this way, the Collection Engine gathers information from many different network devices, each of which has different physical, hardware, software, and firmware characteristics. The Collection Engine generally relies on a data-driven model, in which the information to be gathered from a device is defined by a set of database system tables called MIB Sets. Each MIB Set defines the full device data set that needs to be collected, and that is stored in a Destination Device Data Table. The collection of MIB Sets needed to fully describe a particular device is determined by the Device Class to which a device belongs. The Device Class of a network device is determined by acquiring the device type identifier or sysObjectID from the device, mapping the sysObjectID to the Device Type, and then mapping the Device Type to the Device Class.

Change Detection

The Change Detection mechanism 30 detects, records, and reports on changes in device information.

In the preferred embodiment, the Change Detection mechanism stores the device information in memory, and copies corresponding values from the database into memory. Compare operations are carried out in memory. After the compare operations are complete, the Change Detection mechanism 30 generates a description of the changes that it detects, in the form of metadata. The metadata comprise, for each detected change, the values shown in Table 4:

TABLE 4

CHANGE DETECTION METADATA

Device Identifier
Association_ID
Attributes
UI_Label_ID
Previous Value
Current Value
Updated_At.

In the preferred embodiment, the metadata identified in Table 4 are stored in columns of a Device Inventory Differences or "DEV_INV_DIFF" table of the database 40. In this description, the name "Change Table" is also used to refer to the same table.

The Device Identifier is a value that uniquely identifies a device under management by the system and for which a change is being recorded. The Previous Value and Current Value columns store, respectively, the previous data value and the current data value.

The Attributes value indicates what type of change has been detected in the comparison of the stored table and the current MIB set information. In one embodiment, the Attributes value indicates the type of change that occurred, for example, an update, delete, insert, etc. Preferred values are NEW, UPDATED, and DELETED. The Attributes value also can store information describing the nature of a change, such as a circuit card change, software reload, software update, etc. This enables a system administrator to apply a query against the Differences table to view all changes of a particular type. The values of the code can be defined by an application program that is using the Change Detection mechanism 30. In this way, the information recorded by the Change Detection mechanism 30 is customized for use by different application programs.

The UI_Label_ID value identifies the column in which a change has been detected. In one embodiment, the UI_Label_ID value is a numeric value that points to a text label that is a name of an associated column. It is desirable to store a numeric identifier of a column name, rather than the name itself, to enable the Change Detection mechanism 30 to operate independent of a particular application program. In this way, the column names displayed by the Change Detection mechanism 30 are consistent with the column names or labels displayed by an application program that defined them. Also, this technique allows the Change Detection mechanism 30 to work with any database table, independent of the column layout of such table. In addition, the UI_Label_ID value can store a label for a column that is more descriptive and memorable than a typical database column name.

The Updated_At value is a time stamp that stores the date and time of the last update to the copy of the information that is stored in the database.

The Association_ID value provides a serialized identifier that associates multiple rows of the Device Inventory Differences table, all of which reflect a single set of changes to the tables that have been compared. For example, assume that the Comparison Mechanism determines that three columns of one row of the previous MIB set value table have changed. To reflect these changes, the Device Inventory Differences table stores three change table entries, each of which reflects a change to one of the columns. Each of the entries in the change table associated with the same change event will have the same unique Association value, thereby conceptually tying the entries together. In this way, multiple changes corresponding to a row in the database can be correlated.

Advantageously, the values of Table 4 are generic with respect to any devices, MIB sets, information sets, or tables that are compared. The change mechanism does not need to know, in advance of carrying out comparison operations, the schema of the tables or the MIB sets supported by a particular device.

In an embodiment, in state 9, the Collection Engine 20 supplies a copy of the MIB set values that it has received from the network device 118 to the Change Detection mechanism 30. In state 10, the Change Detection mechanism 30 also receives key values that identify what portions of the MIB sets are to be compared by the Change Detection mechanism 30. In an embodiment, the Change Detection mechanism 30 also receives key values that identify what columns, in the database tables that store the MIB sets 50, are to be updated when the Change Detection mechanism 30 detects a change.

In state 11, the Change Detection mechanism 30 receives a copy of values of MIB sets 50 that are stored in the Managed Device table 42 of database 40. This supplies the Change Detection mechanism 30 with MIB set values that are currently persistently stored in the database 40. The Managed Device table 42 has a row for each individual or unique device in the network. Columns of the Managed Device table 42 store, for each device, an access identifier, a device type associated with the device, the serial number of the device, and a timestamp indicating when values from the MIB sets of the device were last updated into the database 40.

In state 12, the Change Detection mechanism 30 generates a report 22 containing the change information. In one embodiment, report 22 is a database table having columns corresponding to each metadata item shown in Table 4. In another embodiment, the report 22 is generated in a log file format, comprising lines of text that convey the meaning of the change information in an understandable way. Preferably, the report 22 is an HTML file. In one embodiment, the Change Detection mechanism 30 generates a maximum of ten (10) successive report files, each of which is uniquely named; when an other report file is generated thereafter, it overwrites the oldest of the previously generated report files.

In state 13, using the change information, the Change Detection mechanism 30 updates the Device Profile table, by storing new values for only those MIB set values that have changed. The new values that are stored are those previously received from the network device 118. In this way, the Device Profile table is updated with only that information from the network device 118 that has changed. Detected changes are found during a compare key comparison phase of the Change Detection mechanism 30. Needed database updates are found during a database key comparison phase of the Change Detection mechanism 30.

The procedure illustrated in FIG. 2 will now be discussed in more detail using example table data. FIGS. 4C, 4D, 4E, 4F, and 4G illustrate a preferred embodiment of a method for carrying out the comparison process.

Generally, in this embodiment the change detection mechanism compares device data gathered from the device via SNMP, using an inventory collection mechanism, and device data stored in the database from a previous inventory collection. Two types of comparisons are performed. A first comparison is carried out for updating the database with the latest SNMP data. A second comparison is carried out for detecting changes in the device configuration or containment details. Changes that are detected are stored in the database in the Change Table.

After the collection engine completes gathering device data via SNMP, the data is organized into logical database rows and kept in memory. The data stored in the database is read into memory and also arranged into logical database rows. The MIBSET defines two types of keys applied to columns within a database row: Database Keys and Compare Keys.

The columns flagged as Database Keys are actual database key columns. Database keys cannot be NULL. Therefore, the combination of Database Keys within a given row uniquely identifies a row in a database table. SNMP and database logical rows are stored in memory, matched up, and compared for the sole purpose of updating the database. Each column from the SNMP and database logical row is compared. Each logical SNMP database row is marked with the result of the comparison. The change mechanism iterates through each of the SNMP logical rows and updates the database accordingly. There are three possible outcomes:

1. The logical SNMP row did not have a matching logical database row based on the Database Keys This new row needs to be added to the corresponding database table. (NEW)

2. The logical database row did not have a matching logical SNMP row based on the Database Keys. This row needs to be deleted from the database since the device no longer returns this information. (DELETE)

3. The logical database row matched a logical SNMP row based on the Database Keys. If all the columns in the logical database and SNMP row are the same, then no database update is needed. If the any column is different, then the database row needs to be updated with the new value. (UPDATE)

The application of these three possible outcomes is described below in connection with the sample data presented in Table 5 and Table 6. Table 5 represents data obtained from a device. Table 6 represents data stored in the database based upon previous data collection operations for the same device.

TABLE 5

DEVICE DATA

| Row | Interface Index (Database Key) | Physical Address (Compare Key) | Interface Type | Interface Speed |
|---|---|---|---|---|
| 1 | 4 | GG:HH:II:JJ:KK:LL | Ethernet | 100000000 |
| 2 | 2 | AA:BB:CC:DD:EE:FF | FDDI | 10000000 |
| 3 | 5 | 00:00:00:00:00:00 | Slip | 9600 |

TABLE 6

DATABASE DATA

| Row | Interface Index (Database Key) | Physical Address (Compare Key) | Interface Type | Interface Speed |
|---|---|---|---|---|
| 1 | 2 | AA:BB:CC:DD:EE:FF | FDDI | 10000000 |
| 2 | 3 | XX:YY:ZZ:TT:SS:UU | FDDI | 100000000 |
| 3 | 5 | GG:HH:II:JJ:KK:LL | Ethernet | 15000000 |
| 4 | 4 | 00:00:00:00:00:00 | Slip | 9600 |

For example, when the sample information in Table 5 is compared to the information in Table 6, based on the values of the Database Keys, Table 6 row 1 matches Table 5 row 2. Each column value is the same. Therefore, no database update is needed for this row. Table 6 row 2 does not have a matching row in Table 5. Therefore, row 2 of Table 6 needs to be deleted from the database.

Table 6 row 3 matches Table 5 row 3. The Physical Address, Interface Type, and Interface Speed columns are different. Therefore, the values in the database need to be updated to conform to the device data. Similarly, Table 6 row 4 matches Table 5 row 1. The values in the Physical Address, Interface Type, and Interface Speed columns are different. Therefore, row 4 of Table 6 needs to be updated in the database to match the device data.

The comparison performed based on the Database Key values is useful for updating the database, but are not necessarily useful for reporting changes that have occurred on a device. On occasion, the software that controls a device will reorganize information stored in the device when the device reboots, even if no substantive values have changed. For example, re-organization sometimes changes the values of SNMP specific indexes, even though no physical or logical change has occurred within the device. If the SNMP index value is used a key to update the database, then multiple changes would be discovered even though nothing substantive has changed in the device. Such changes would mean nothing to a network administrator for they do not affect the device's operation and the SNMP indexes are only used internally by the SNNP agent software; indeed, reports of such changes could cause confusion.

Accordingly, the change detection mechanism provides a second, different comparison method that compares changes in substantive device information, and ignores changes in values or columns that are known to be meaningless to the network administrator.

The second comparison is carried out based upon Compare Keys. Columns in a MIB set that are flagged as Compare Keys uniquely identify a row in the database, but are not necessarily database keys. Compare Keys are used to match logical database and device data rows for detecting changes that indicate that substantive information in the device has changed. The Compare Key comparison ignores meaningless changes to information such as SNMP indexes. The second comparison does not cause any database update operations. Instead, information that describes changes identified during the second comparison is stored in a Change Table. The Change Table is used to generate change reports. The change reports summarize, for the network administrator, information that has changed in the managed devices since previous collection operations.

The second comparison results in one of three possible findings. The first possible finding is the device data row did not have a matching database row based on the Compare Keys. Generally, this result indicates that something has been added to the device, such as a new interface or a feature previously turned off has been enabled. Information about such a finding is stored in the Change Table as a NEW type of change.

The second possible finding is that a database row did not match any device data row based on the Compare Keys. Generally, this finding indicates that something has been removed from the device, such as a card or a feature previously turned on has been disabled. Information about such a finding is stored in the Change Table as a DELETE type of change.

The third possible finding is that a database row matched a device data row based on the Compare Keys. If all values of the columns in the database row and the device data row are the same, then nothing has changed for that particular row. If any value is different, in general, something on the device has changed, such as the configuration. Accordingly, information about such a change is stored in the Change Table as an UPDATE type of change.

For example, comparing the information in Table 5 and Table 6 based on the values of the Compare Keys, Table 6 row 1 matches Table 5 row 2. Each column value is the same. Therefore, no change is recorded in the Change Table for this row. Table 6 row 2 does not have a matching device data row. This indicates that the device is no longer returning the information stored in Table 6 row 2. Information about this change is marked in the Change Table as a DELETED type of change.

Table 6 row 3 matches Table 5 row 1. The Interface Speed columns are different. Therefore, a row is inserted into the Change Table to reflect the change. Values in the Change table indicate that the value of the Interface Speed column for the row with a Compare Key of "GG:HH:II:JJ:KK:LL" was UPDATED. The Compare Key value is stored in the Change Table to identify in which row the change was detected. In this case, since a Physical Address is unique to a device card, the Compare Key identifies the card with the detected change. The Interface Index is not stored as a change, because it is a Database Key and it is not relevant for change detection.

Table 6 row 4 matches Table 5 row 3. Only the Interface Index value is different. However, since the Interface Index value is not a substantive value of interest to a network administrator, no change record is stored in the Change Table.

Thus, use of Compare Keys enables the change detection mechanism to compare data in a manner that identifies substantive changes on the device and ignores irrelevant changes.

Figure 4A:
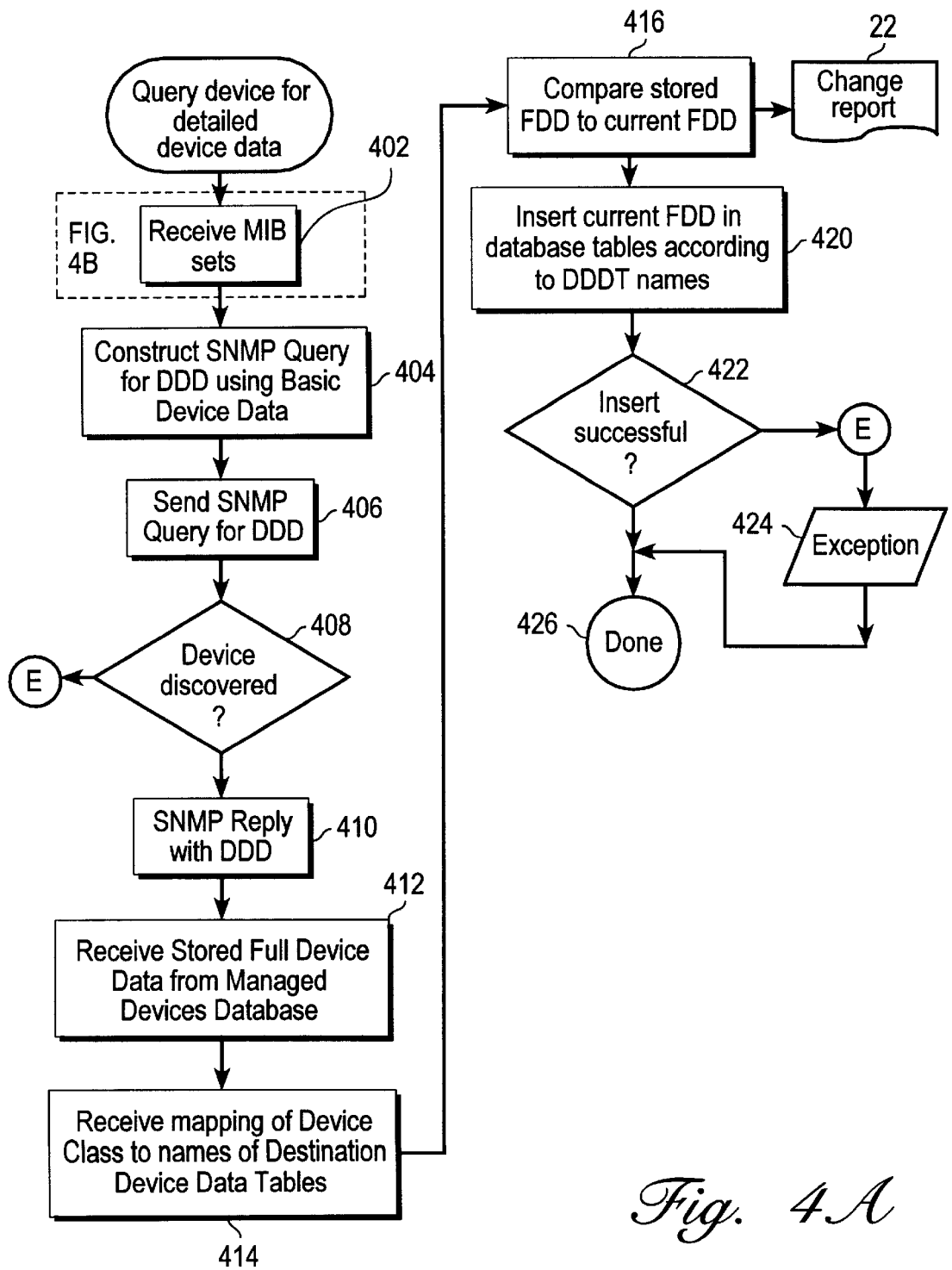
FIG. 4A is a flow diagram of a method of querying a device for detailed device data.
Figure 4B:
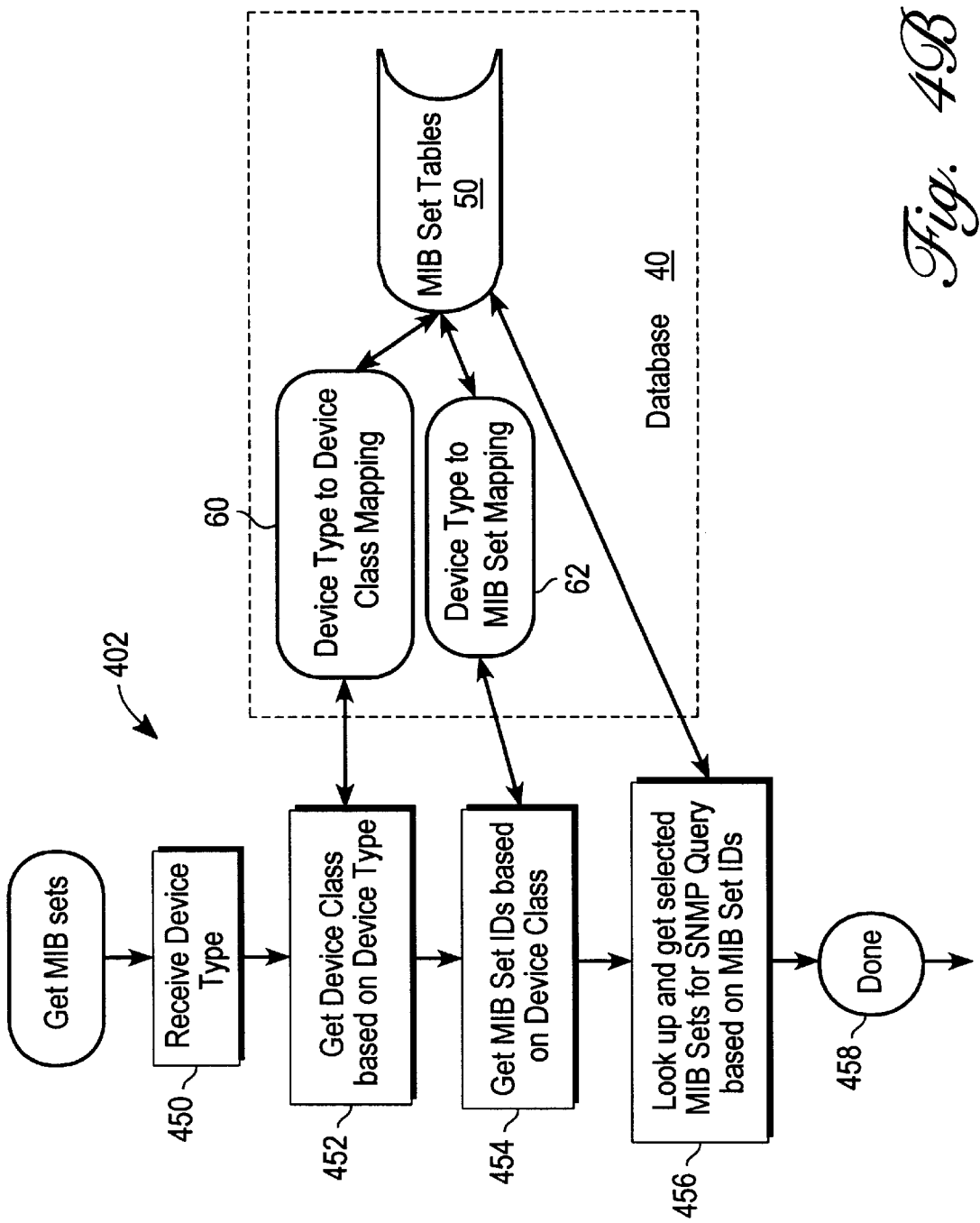
FIG. 4B is a flow diagram of a method of retrieving MIB Set information from a device.
Figure 4C:
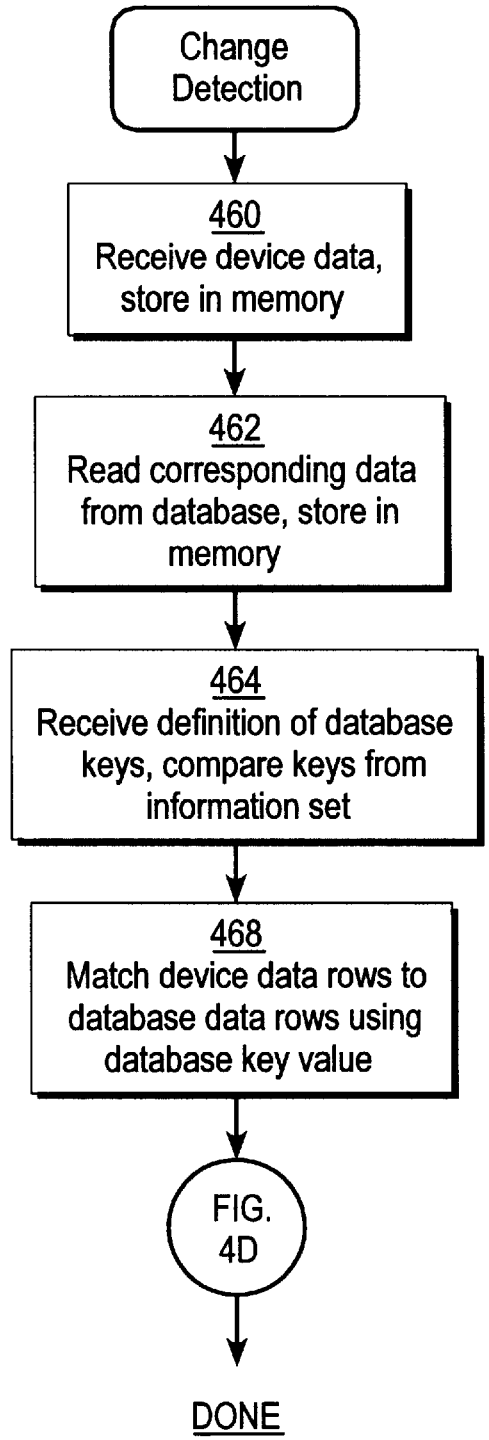
FIG. 4C, FIG. 4D, FIG. 4E, FIG. 4F, and FIG. 4G are a flow diagrams of a method of detecting changes in MIB Set information.

Referring now to FIG. 4C, an embodiment of a change detection method is shown. In block 460, a change detection mechanism receives device data and stores it in main memory. In block 462, the mechanism reads corresponding data from the database and stores it in the main memory. In block 464, the mechanism receives a definition of a set of database keys and a set of compare keys from an information set associated with the device.

Figure 4D:
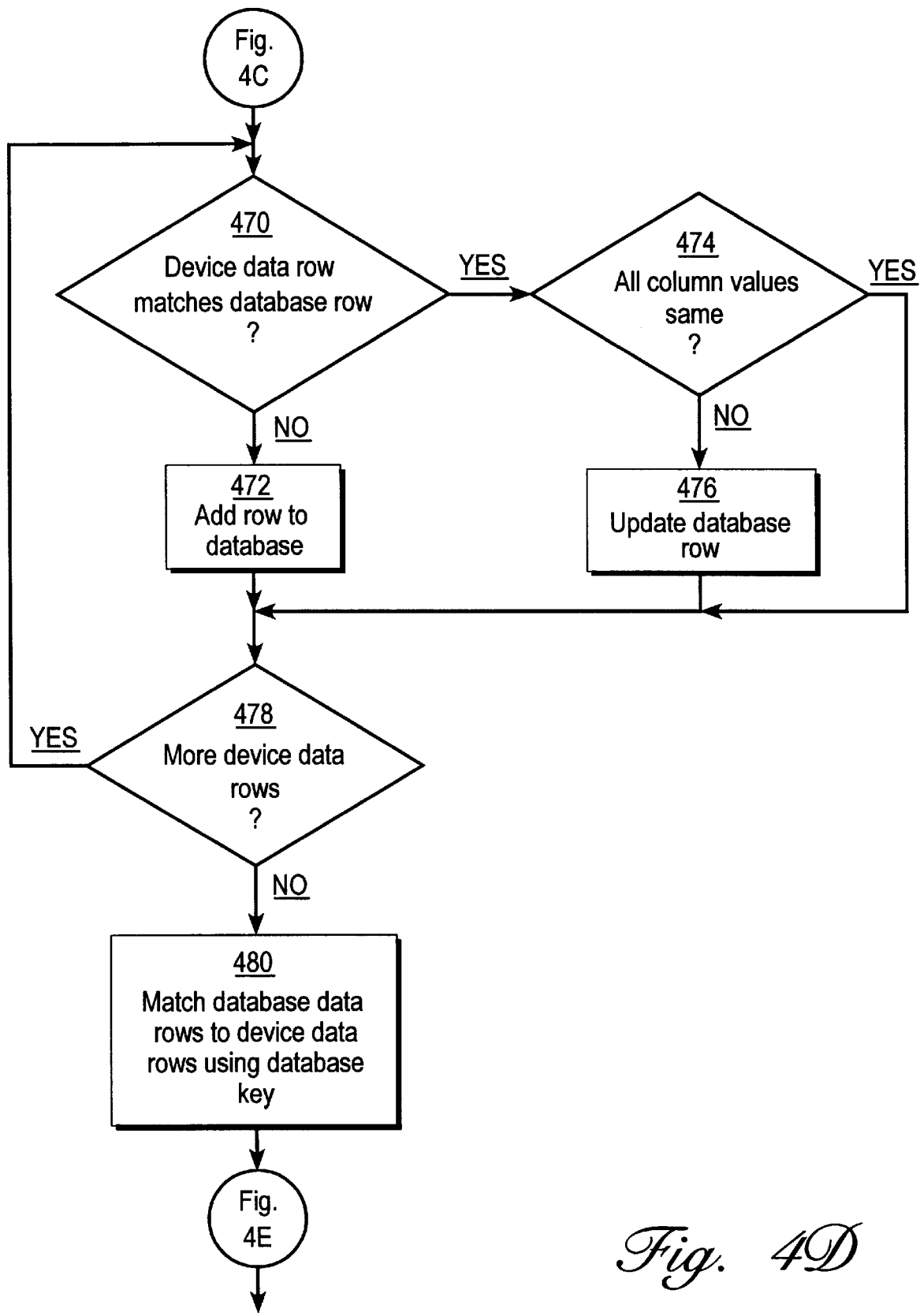

In block 468, the mechanism initiates comparison of the device data to the database data, based on the database key value, by matching rows the of the device data to rows of the database data. As shown in FIG. 4D, in block 470 the mechanism tests whether the current device data row matches a row in the database. If there is no match, then the current device data row has been added to the data provided by the device since the last update to the database. Therefore, a row is added to the database, as shown in block 472. If there is a match, then in block 474 the mechanism tests whether the values in the current device data row match values in all corresponding columns of the matching database row. If there is a discrepancy, then a value has changed since the last database update. Accordingly, in block 476 the mechanism updates the changed value in the database row.

In block 478, the mechanism tests whether more device data rows need to be processed. If so, control is passed back to block 470 so that further comparisons are done.

Figure 4E:
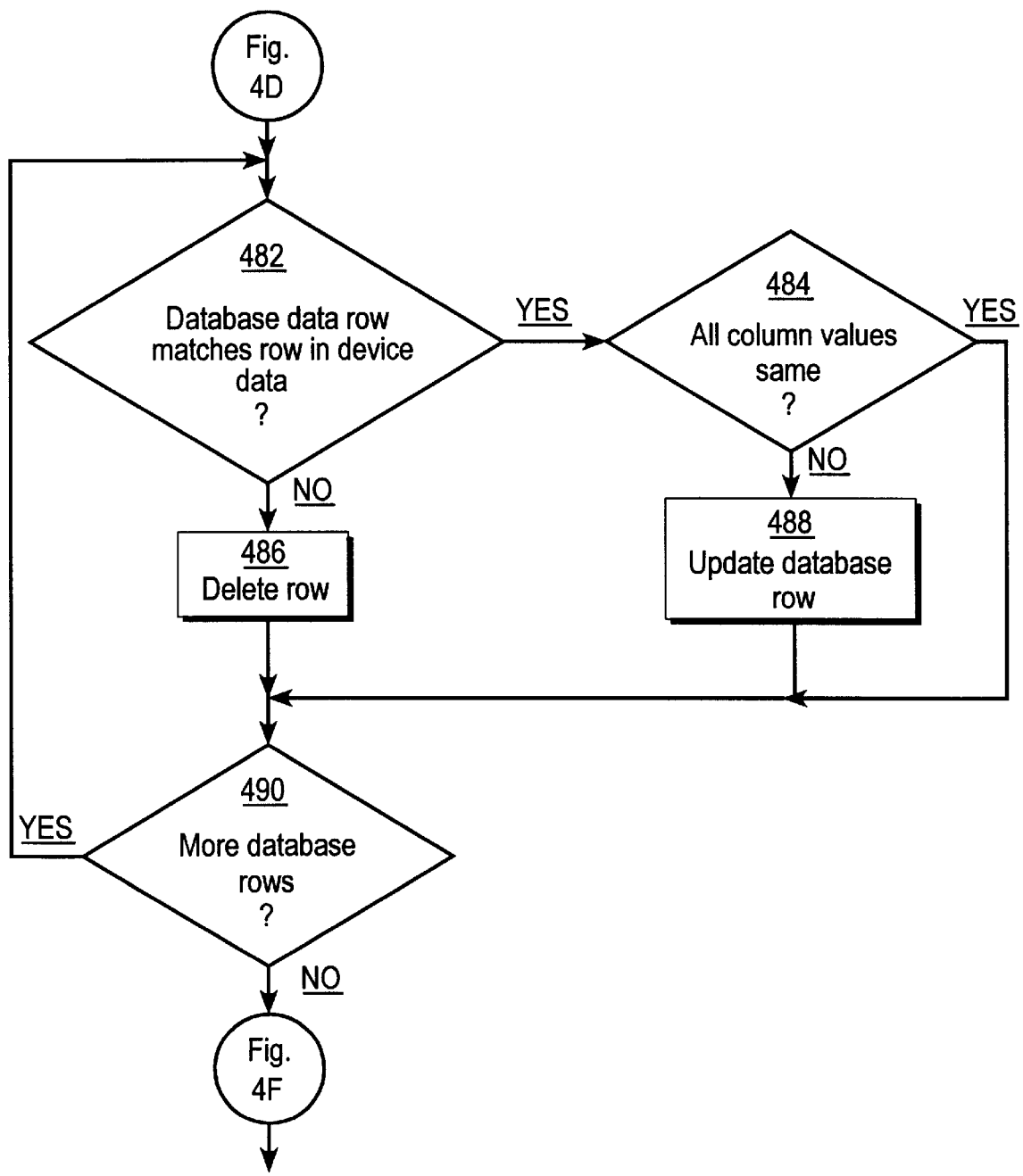

In block 480, the mechanism carries out the complementary process of matching data rows of the database to device data rows using the database key value. In block 482 of FIG. 4E, the change mechanism tests whether a database data row matches one of the rows of data received from the device. If there is no match, then the database contains a row that is no longer delivered by the device. Accordingly, in block 486 the mechanism deletes that row from the database. The logic of blocks 484, 488, and 490 of FIG. 4E is similar to that of blocks 470 to 478 of FIG. 4D, described above.

Figure 4F:
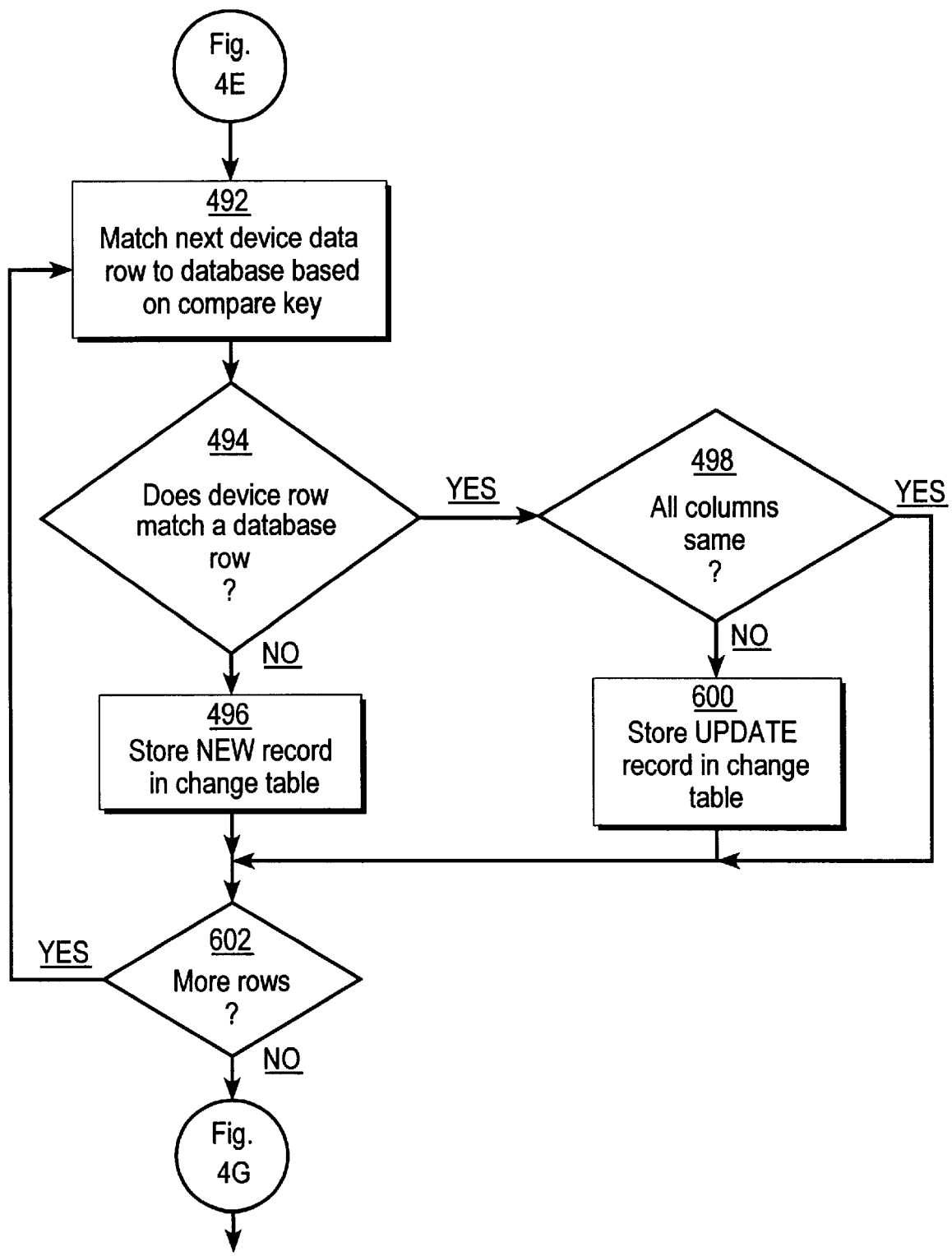
Figure 4G:
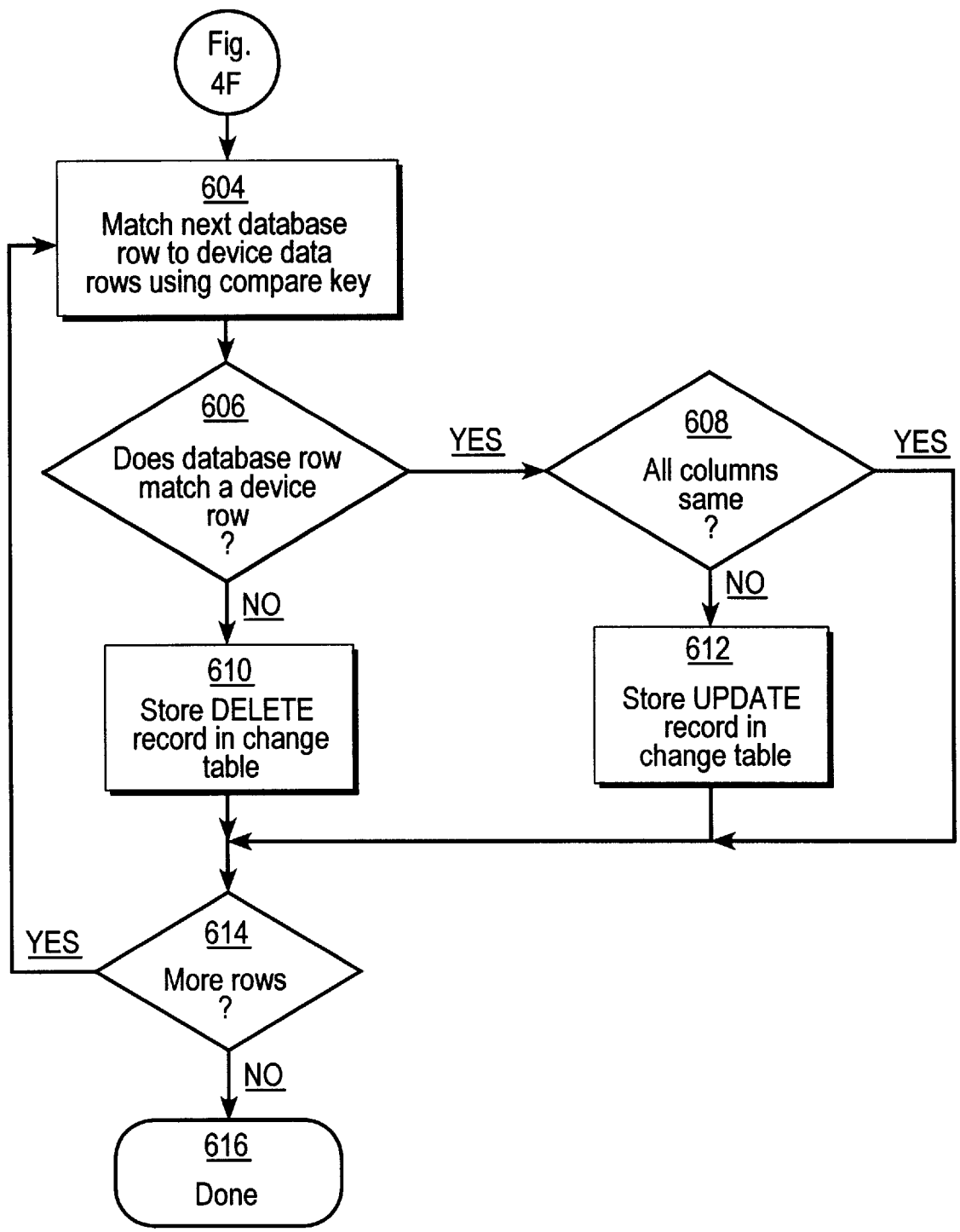

FIG. 4F and FIG. 4G show processing involved in comparing device data to database data based on the compare key. The logic of blocks 492 to 614 of FIG. 4F and FIG. 4G is generally similar to the logic of blocks 470 to 490 of FIGS. 4D and 4E, described above, except that the comparisons are carried out based on the compare key. Also, as shown in blocks 496, 600, 610, and 612, when matches are not found, appropriate records are stored in a change table, providing a record of changes detected in the data sets.

For example, when a device data row does not match any of the database rows, then in block 496 the mechanism stores a record in the change table indicating that the device data row is new. The database is not updated, because such updating is carried out in the steps of FIG. 4D and FIG. 4E. If a match is found, but a value has changed in a column of the device data row, then in block 600 the mechanism stores a record in the change table indicating that the device data row has been updated.

Similarly, if a database row does not match any of the rows of device data, then in block 610 the mechanism stores a record in the change table indicating that the row has been deleted from the data supplied by the device. If there is a match, but there is a change in the value of a column, then in block 612 the mechanism stores a record in the change table indicating that the device data has been updated.

In an alternative embodiment, change detection is accomplished by comparing database tables. A first version of MIB set information is stored in a database table. A second version of MIB set information, to be compared to the first version, is generated by requesting values or the contents of a MIB set from a network device; when responsive information is received, it is stored in a temporary database table. The two database tables are then compared using standard Structured Query Language (SQL) compare operations, and based upon the comparison keys that are specified in the Device Class to MIB Set Mapping 62.

Data Collection and Change Detection Method

FIG. 4A is a flow diagram of an embodiment of a method of carrying out the processes described above in connection with states 7 through 13 in which a network device is queried for device data, the data received from the device is compared to the device data stored in the database, and any changes are detected and stored in a discrepancy table.

In block 402, MIB Sets corresponding to the network device that is to be queried are received. FIG. 4B, discussed below, is a flow diagram of an embodiment of sub-steps of block 402.

In block 404, an SNMP query is constructed to request the detailed device data (DDD) from the network device. The query is constructed based upon a device type to MIB set mapping using, for example, the basic device data that was received in block 310 of FIG. 3. In block 406, the SNMP query for the detailed device data is sent out to the network 108.

In block 408, the method tests whether the device 118 has been discovered in the network. If not, control is passed to block 424, in which an exception is raised and passed back to the calling application program. If the device 118 is discovered successfully in the network, then in block 410 the device provides an SNMP reply message containing the detailed device data.

In block 412, the method retrieves a copy of the full device data for the device 12 that is stored in the managed devices database. The method then determines how to insert the detailed device data received from the network device 118 into the managed devices database. To do this, in block 414 a mapping is received that correlates the Device Class of the network device 118 to names of Destination Device Data Tables in the database 40. This provides the method with a list of tables in the database 40 that correspond to the class of the current network device 118.

In block 416, the device data stored in the database is compared to the device data that has been received from the device. In block 418, the method generates a list of differences between the stored data and the data received from this device. In one embodiment, the list of differences is stored in a database table having the structure described above under the heading "Change Detection".

In block 420, the current device data in the database 40 is updated, in the tables having the names identified by the mapping obtained in block 414, i.e., the mapping of the device class of the current device to MIB Sets. In block 422, the method tests whether the database insert operation was successful. If it was not, then in block 424, an exception is raised. Otherwise, if the insert was completed properly, then processing is complete as shown by block 426.

FIG. 4B is a flow diagram of a method of retrieving MIB set definitions for use with a particular network device.

In block 450, the method receives a device type identifier, such as the device type that is located in blocks 312–314 of FIG. 3. In block 452, the device class of the current network device 118 is obtained from the database 40 based on the device type. In one embodiment, the database 40 includes a device type to device class mapping 60. The mapping 60 may be stored in a table of the database system 40 that correlates device types to device classes, and in which the device type column is declared as a key field.

Once the device class is obtained, in block 454 the method retrieves, from the database 40, identifiers of MIB Sets that correspond to the device class. In one embodiment, this is carried out using a table of the database 40 that is a device class to MIB Set mapping 62. For example, the database 40 has a table with columns for device type and MIB Set identifiers, in which the device type is a key. Using this mapping, in block 456 each MIB Set identified in the mapping 62 is retrieved from among the MIB Set 50.

In this way, the method obtains only those MIB Sets that correspond to the device type and device class of the current network device 12. As indicated by block 458, this completes the processing steps shown in FIG. 4B.

MIB Set Preparation

In the preferred embodiment, MIB files are prepared in plaintext form and stored in a single file system directory of the Network Management Server 102. The Network Management Server 102 runs under control of the UNIX operating system or any other suitable operating system that has a directory system or file system. In this embodiment, the MIB files are compiled into definition files having a file type of ".def" using the public domain utility program "xmosy".

A list of all the ".def" files that are to be used by the Collection Engine 20 is stored in a text file that is named "allmibs.1st". The sequence in which the files appear in the list must follow any dependencies that the MIBs have on each other. The utility program "cwgenmib," which is available from Cisco Systems, Inc. as part of its CiscoWorks product, is then run. It receives the "allmibs.1st" file as input and generates a unified MIB definition file as output.

The unified MIB definition file is loaded into the SNMP Function Library 116, which is used to generate SNMP packets for specific application queries. This process is carried out using either a dedicated utility program, a function of the Collection Engine 20, or a separate function that is called by an application program such as the inventory application 114.

Hardware Overview

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for collecting network device information and detecting changes in the information. According to one embodiment of the invention, mechanisms and processes for collection network device information and detecting changes in the information are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, RAM, PROM, EPROM, FLASH-EPROM, any other memory chip or cartridge, a carrier wave as described hereinafter, or any other medium from which a computer can read information.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector coupled to bus 502 can receive the data carried in the infra-red signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides mechanisms and methods for collecting network device information and detecting changes in the information, as described herein.

The received code may be executed by processor 504 as it is received, and/or stored in storage device 510, or other non-volatile storage for later execution. In this manner, computer system 500 may obtain application code in the form of a carrier wave.

Variations, Modifications, and Changes

In the foregoing specification, the invention has been described with reference to specific embodiments thereof. It will, however, be evident that various modifications and changes may be made thereto without departing from the broader spirit and scope of the invention. For example, in discussing the preferred embodiment, it has been convenient to refer to queries and networks that use the SNMP protocol. However, the invention is not limited to those contexts, and can be used with other suitable communication methods. The specification and drawings are, accordingly, to be regarded in an illustrative rather than a restrictive sense.

What is claimed is:

1. A method of collecting information about a managed device in a data network for storage in a database, the managed device comprising a plurality of MIB values stored in one or more Management Information Bases, comprising the steps of:

(A) obtaining a device type identifier from the managed device by sending an SNMP request to the managed device based upon basic device data to the device over the network, testing whether the device is contacted in the network, and receiving an SNMP reply containing detailed device data relating to the device;

(B) mapping the device type identifier to one or more MIBs that are associated with the device type identifier, wherein the MIBs are selected from a larger plurality of MIBs based on the device type identifier and a device class into which the device type identifier is classified;

(C) obtaining current values for only the mapped MIBs from the managed device using an SNMP request; and (D) storing said current values in a current MIB value table of the database in association with the device type identifier.

2. The method recited in claim 1 further comprising the steps of verifying that the device type identifier obtained from the managed device is known to the database by (E1) looking up the device type identifier in a device type table stored in the database; and (E2) when the device type identifier is not found in the device type table, mapping the device type identifier to a plurality of sets of the management information bases that are associated with a generic device type, wherein the plurality of sets of management information bases is selected from a larger plurality of the management information bases based on the device type identifier and a device class into which the device type identifier is classified.

3. The method recited in claim 1, wherein step (B) comprises the steps of:

(B1) looking up the device type identifier in a first table of the database that maps the device type identifier to a plurality of identifiers of the management information bases; and (B2) retrieving, from a second table of the database that stores a plurality of sets of the management information bases, a subset of said plurality of the management information bases that corresponds to the plurality of identifiers of the management information bases.

4. The method recited in claim 1, wherein step (B) comprises the steps of:

(B1) looking up the device type identifier in a Device Type to MIB Set table of the database that maps the device type identifier to a plurality of MIB Set identifiers; and (B2) retrieving, from a MIB Set table of the database that stores a plurality of MIB Sets, a subset of said plurality of MIB Sets that corresponds to the plurality of MIB Set identifiers.

5. The method recited in claim 1, further comprising the steps of:

(F) comparing values in the current MIB value table to corresponding values in a prior version MIB value table in the database;

(G) detecting changes that characterize the current MIB value table when compared to the prior version MIB value table; and (H) generating a report of the changes.

6. The method recited in claim 5, wherein step H comprises the steps of:

for each change detected in step (G), storing information characterizing each change in columns of a change table in the database, including:

a Table Identifier value that identifies the MIB that has changed;

an Association value that identifies a location in the MIB at which the change occurred;

an Attributes value that describes a type of the change;

a Previous Value derived from the prior MIB value table; and a Current Value derived from the current MIB value table.

7. The method recited in claim 1, further comprising the steps of:

(F) receiving a set of prior values for the MIBs from the database;

(G) receiving a compare key;

(H) matching the set of prior values to the current values according to the compare key;

(I) when a change is detected in step (H), storing metadata describing the change in a change table.

8. A method of collecting information about a managed network device in a data network for storage in a database, the managed device comprising a plurality of MIB values stored in one or more Management Information Bases, comprising the steps of:

receiving a device identifier;

mapping the device identifier to a device type value;

mapping the device type value to a device class value;

mapping the device class value to information identifying a subset of MIBs that are supported by devices within a device classification associated with the device class value;

retrieving from the device, current MIB variable values for only the subset of MIBs that are identified; and storing the current MIB variable values in a database.

9. A method as recited in claim 8, wherein retrieving current MIB variable values comprises the steps of:

querying the device for detailed device data and receiving detailed device data from the device;

retrieving stored full device data from the database;

mapping the device class value to the detailed device data;

comparing the stored full device data to only those values in the detailed device data that map to the device class value; and generating a change report based on differences that are found during the comparing.

* * * * *